Dec. 18, 1923.                         1,478,324
A. DINA
UNIVERSAL JOINT
Filed Nov. 18, 1921
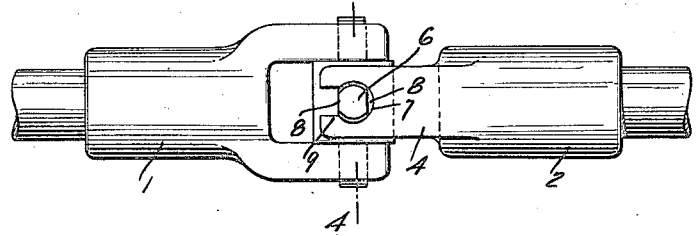
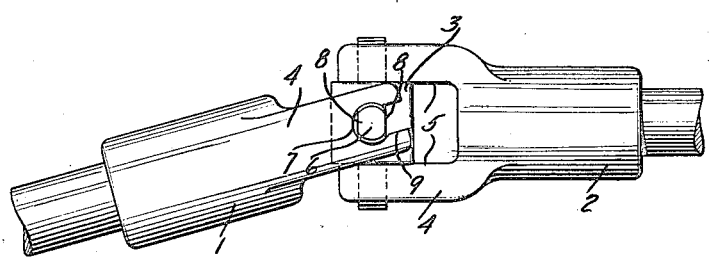
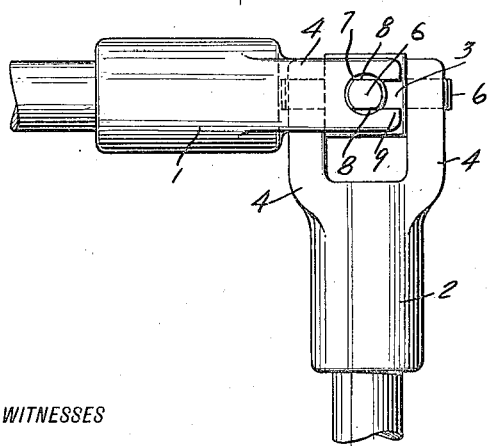
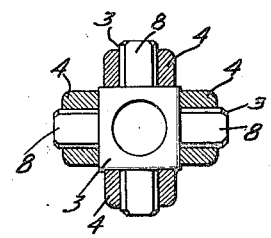
WITNESSES
Frederick Diehl.
S.W. Foster
INVENTOR
AUGUSTO DINA
BY
ATTORNEYS Patented Dec. 18, 1923.

1,478,324

UNITED STATES PATENT OFFICE.

AUGUSTO DINA, OF WOODBRIDGE, NEW JERSEY.

UNIVERSAL JOINT.

Application filed November 18, 1921. Serial No. 516,076.

*To all whom it may concern:*

Be it known that I, AUGUSTO DINA, a subject of the King of Italy, and a resident of Woodbridge, in the county of Middlesex and State of New Jersey, have invented a new and Improved Universal Joint, of which the following is a full, clear, and exact description.

This invention relates to improvements in universal joints, an object of the invention being to provide a universal joint which enables the members thereof to be uncoupled when moved to an abnormal position and yet when in normal working position, provides mechanism bearing surfaces for the engaging parts.

A further object is to provide a universal joint which is extremely simple in construction, relatively cheap to manufacture, and strong and durable in use.

With these and other objects in view the invention consists in certain novel features of construction, and combinations and arrangements of parts as will be more fully hereinafter described and pointed out in the claim.

In the accompanying drawings—

Figure 1 is a view in side elevation illustrating the members of my improved universal joint in alignment.

Figure 2 is a similar view showing one of the members at an angle to the other, which is the extreme angle of movement during normal operation showing that the members have a full bearing or contact surface with relation to their trunnions throughout all normal positions.

Figure 3 is a view showing the members of the joint at right angles to each other, which is an abnormal and extreme position and illustrating such position to show how the members may be uncoupled.

Figure 4 is a view in transverse section on the line 4—4 of Figure 1.

1 and 2 represent the two members of my improved universal joint and 3 is a rectangular coupling block. The members 1 and 2 have bifurcated ends 4, the members of which are equally spaced apart and have relatively flat inner faces 5 for the accommodation of the coupling block 3. This coupling block 3 is made with four trunnions 6 projecting at right angles from four sides of the block 3 and the members of the bifurcated ends 4 of the members 1 and 2 have curved bearings 7 concentric with the curvature of the trunnions 6 so as to receive said trunnions and pivot freely thereon.

The trunnions 6 are made with parallel flat sides 8 reducing the diameter of the trunnions sufficient to move through slots or recesses 9 in the extreme ends of the members 1 and 2, but it will be noted that the walls of the slots 9 are spaced apart a distance appreciably less than the diameter of the bearings 7, although said slots communicate directly with said bearings. The trunnions 6 are so positioned that in order for the walls of slots 9 to align with the flat sides 8 of said trunnions, it is necessary to move the members 1 and 2 to a position at right angles to each other, as shown in Figure 3, and when in this position, the member 1, when moved longitudinally, will move off of the trunnion 6. This position shown in Figure 3 is an abnormal position, and hence, uncoupling of the members is afforded only when the members are in an abnormal position.

In operation, the members are movable at an angle to each other to properly function, but in all operative positions, the trunnions 6 have a full bearing surface contact with the bearings 7 of the members. It is a well-known fact that only a relatively small surface contact of a trunnion or other journal in its bearing is had during normal operation, and this applies particularly to universal joints, and I have provided a full and ample bearing for the trunnion in all normal positions of the members 1 and 2, but have so constructed the trunnion and the members as to permit a ready uncoupling or separation of the members when the latter are moved to an extreme position, which, in the present instance, is at a right angle to each other.

Various slight changes might be made in the general form and arrangement of the parts described without departing from the invention, and hence I do not limit myself to the precise details set forth, but consider myself at liberty to make such alterations and changes as fairly fall within the spirit and scope of the appended claim.

I claim:

A universal joint comprising a pair of bifurcated members each presenting at the end of the bifurcation a circular bearing and a longitudinal slot, said slot being of a width smaller than the diameter of said bearing, a coupling block presenting a plurality of oppositely disposed trunnions fitting in the space between the arms of the bifurcation, said trunnions having flat parallel sides spaced apart for a distance corresponding substantially to the width of said slots to permit the passage of the former through the latter to couple or uncouple the members when the same are at an abnormal angle relative to each other.

AUGUSTO DINA.